Patented May 3, 1938

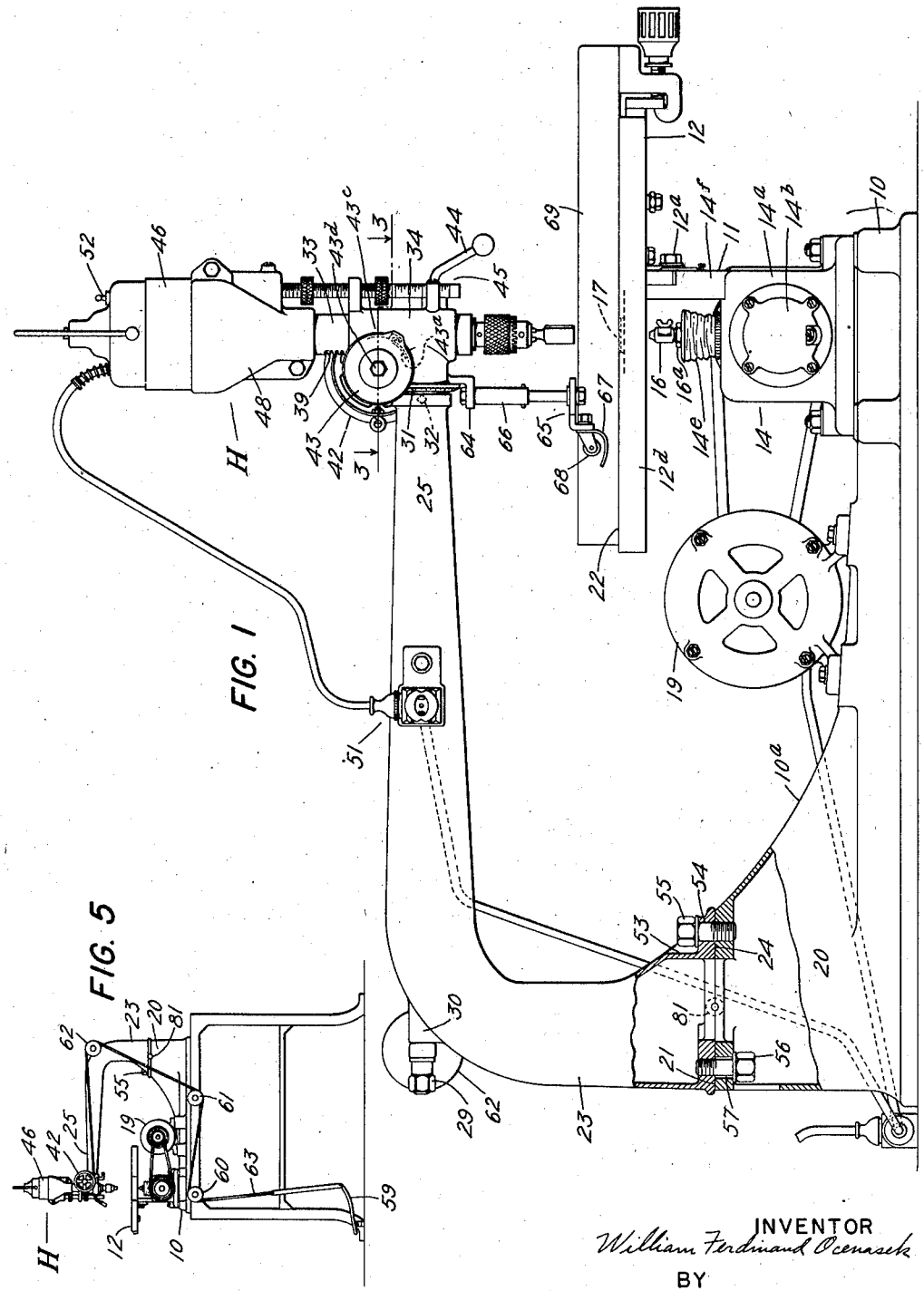

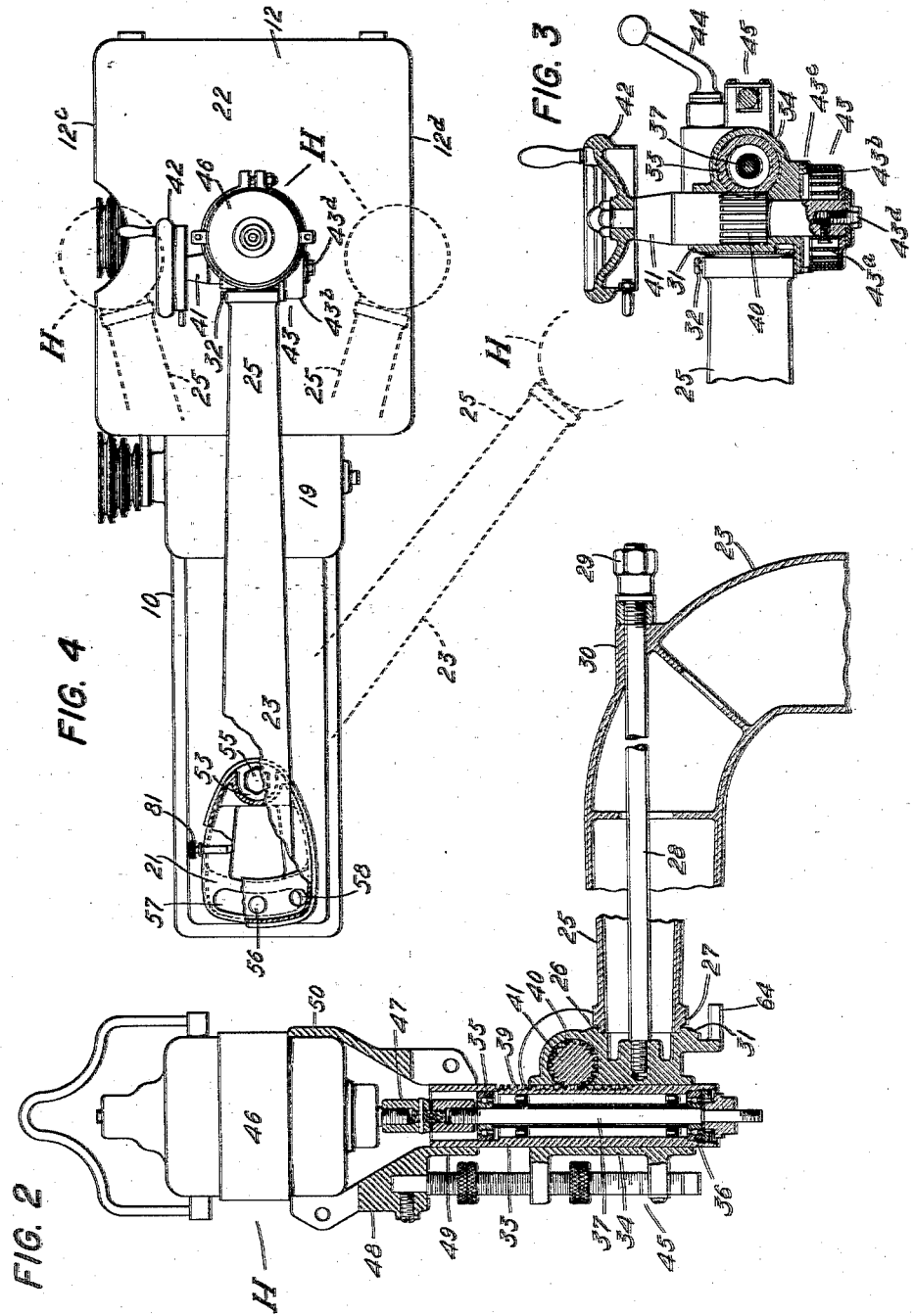

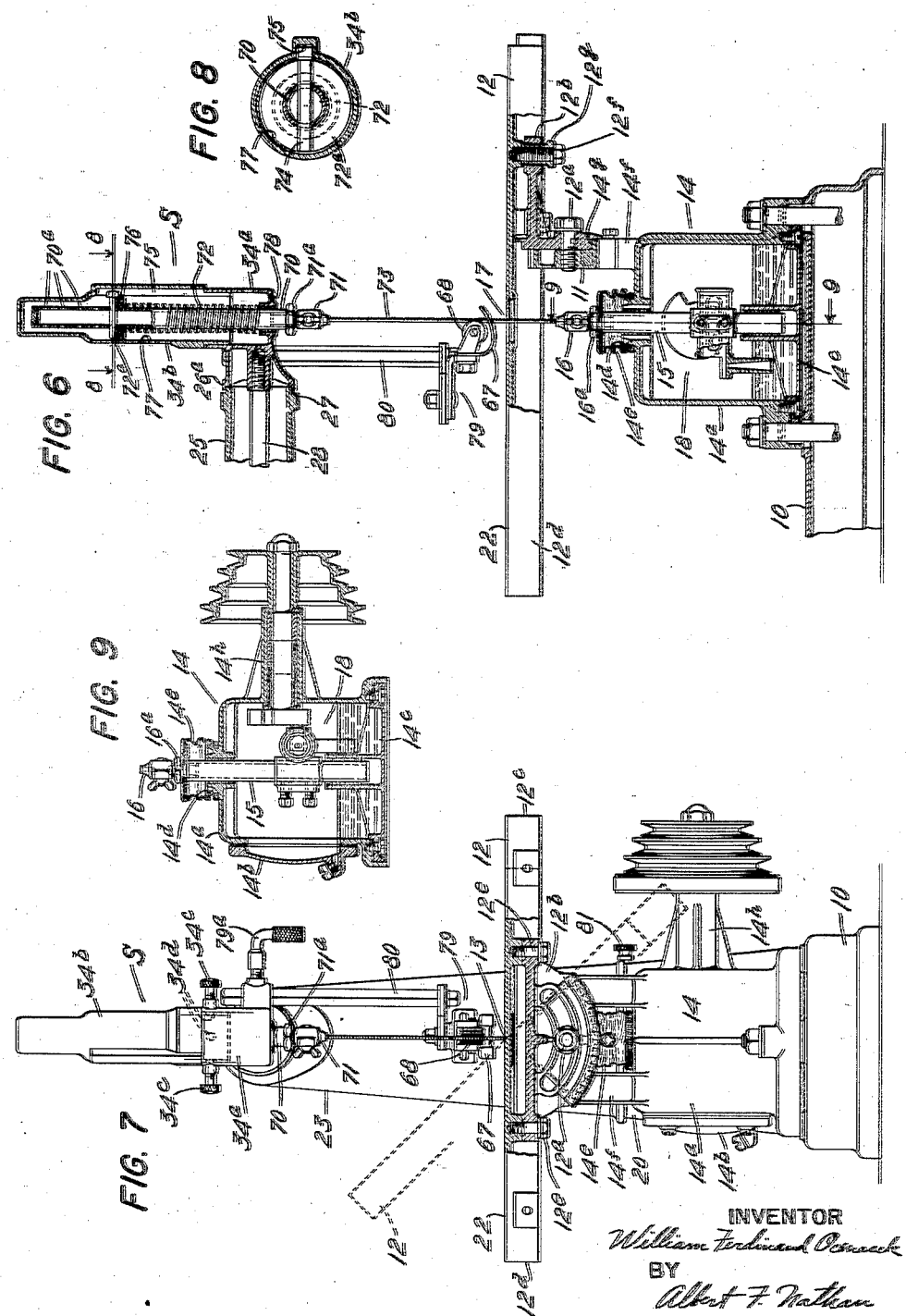

2,116,122

UNITED STATES PATENT OFFICE 2,116,122

MACHINE TOOL

William Ferdinand Ocenasek, Plainfield, N. J., assignor to Walker-Turner Company, Inc., Plainfield, N. J., a corporation of New York Application November 16, 1935, Serial No. 50,119

15 Claims. (Cl. 90—14)

The present invention relates generally to routing machines and particularly to removable routing assemblies and improvements in the mounting of routing machine spindles.

It has for a primary object to render available a machine tool which includes the combined functions of a number of cooperating machines and which may be readily converted from one type of machine to another with the ease and rapidity essential in certain arts.

In the production of printing plates, for example, an operator frequently is obliged to rout out an area or section from the top of a combined wood and metal plate and then trim off or remove a full section of the plate. Heretofore, operations of that character required two machines, one for sawing and one for routing and in consequence a great amount of time was consumed in moving the work from one machine to another. With the aid of the present invention, however, routing and sawing, and analogous operations may be performed upon the one machine without idle or wasted time between operations.

A further object of this invention is to provide a machine capable of performing any of the above mentioned types of operations on large workpieces and in which the tools are firmly and rigidly supported under all conditions of normal usage. Particularly, is this important when using the machine as a router, for such tools are efficiently operated only when driven at a tremendously high speed and very firmly supported. Unless such tools are adequately supported, the vibration incident of the high speed of rotation causes spindle run-out and introduces errors in the operations performed thereby as well as grave danger in the use of the machine.

Still another object of the present invention is to render available a machine tool having upper and lower cooperating tool operating mechanisms and in which provision is made for the quick and easy replacement of one of the mechanisms by one adapted to perform a particular character of operation different from that or those performed by the other mechanisms.

In attaining the objects of the invention it is proposed to provide a relatively long base member with a work support adjacent one end thereof, and provide under the work support power driven tool operating mechanism, such as jig saw mechanism. The other end of the base member supports an over-arm which extends forward and overlies the work support, and is provided at its free end with a removably mounted tool head attachment.

A further aim of the present invention is to render available a jig saw operating mechanism constructed upon the unit principle devoid of extraneous parts and fittings difficult to machine, assemble and to maintain in perfect alignment, and to construct such a unit, with a single casing which, apart from a cover and an inspection plate, provides all of the bearings for the moving parts, as well as the supporting surfaces for seating a tiltable work table to the end that all of the bearings, surfaces etc. may be formed upon and in a single element and thus insure proper and permanent alignment of the several related and cooperating parts of the jig saw mechanism.

The invention also proposes to provide an improved mechanism for holding saw blades of various lengths and which likewise is constructed as a unit and adapted to be detachably mounted to the machine frame in cooperative relation with the saw operating mechanism below the work table. For performing one type of operation the arm may have mounted thereon an attachment designed to cooperate with the tool operating mechanism below the table, while for another type of operation an attachment may be mounted upon the arm which may be operated independently of the mechanism below the table.

The router attachment above mentioned, consists of a power driven rotary tool useful for recessing, grooving, carving, etc. The invention proposes an assembly, which may be conveniently constructed and mounted in a manner assuring vibrationless operation and highly accurate work, as a unitary mechanism and which may be pivotally mounted upon the free end of a laterally movable arm of the machine. By way of further refinement the invention aims to provide a translatable router spindle having a minimum amount of spindle overhang, and so constructed that the spindle is accurately guided and supported as close to the spindle nose as possible and in a manner which affords the user a substantially unobstructed view of the cutter. With a swivel mounting for the router assembly a user may thereby tilt the unit to any desired angular position and perform a routing, or analogous rotating tool operation in a very convenient and expeditious manner.

Certain tooling operations are more easily performed outside of the working surface of the work table, for example, upon such pieces which on account of their size cannot be mounted upon the table, or for example, in dovetailing operations in which the tool simultaneously cuts end and side grain upon complemental pieces making up the joint. The invention also aims to provide a machine adaptable for the performing of tooling operations outside of the work surface and that is accomplished by the provision of a pivotal mounting for the base of the over-arm of the machine. The arm member and the removable tool head may thereby be swung laterally over the entire surface of the work table or to a point outside of the surface and firmly clamped in a predetermined radially adjusted position. The swinging feature of the arm is useful not only in performing operations with the routing assembly but is highly advantageous when using a saber blade saw in the tool operating mechanism mounted below the work table. The ability to swing the over-arm and attached tool head out of the way in the mounting or removing of a workpiece, greatly facilitates the sawing operation, particularly in confined or enclosed areas.

Another object of the present invention is to provide a combination machine with means carried by each removable head adapted to cooperate with the tool operating mechanism below the table to the end that certain types of tooling operations may be performed by the mechanism below the table without necessarily removing or substituting any particular head upon the over-arm. In achieving that end it is proposed to equip each removable head unit with a bracket member with bearing surfaces complemental to those provided at the free end of the arm, and also with a means for attaching an extensible pressor foot and back stop. The back stop cooperates with the saw blades and gives the necessary support thereto at the rear, while the pressor foot overlies the work and exerts a downwardly acting force thereon to keep the work from vibrating or jumping out of the operator's hands. Thus, if the machine is set up with a routing head, it may be operated as a sawing machine or as a routing machine depending upon the nature of the operation it is desired to perform.

Other objects and advantages will be in part indicated in the following description and in part rendered apparent therefrom in connection with the annexed drawings.

To enable others skilled in the art so fully to apprehend the underlying features hereof that they may embody the same in the various ways contemplated by this invention, drawings depicting a preferred typical construction have been annexed as a part of this disclosure and, in such drawings, like characters of reference denote corresponding parts throughout all the views, of which:—

Figure 1 of the drawings illustrates a machine tool embodying this invention.

Figure 2 is an enlarged sectional view of the router head illustrating more clearly a preferred method of swivably mounting the unit and rigid support given to a translatable spindle close to the spindle nose.

Figure 3 is a detailed sectional view along the line 3—3 of Figure 1.

Figure 4 is a plan view of the machine, partly broken away, illustrating a method of obtaining lateral movement of the arm and for clamping the arm in a predetermined position, and in dotted lines, a number of radial positions.

Figure 5 is an assembly view, illustrating a pedestal mounting for the machine and a treadle operated feed for the router head.

Figure 6 is a detail view of the jig-saw head attachment and its cooperating mechanism.

Figure 7 is a front view thereof.

Figure 8 is a sectional view along lines 8—8 of Figure 6.

Figure 9 is a sectional view along lines 9—9 of Figure 6.

Referring to Figure 1 of the drawings, the machine there illustrated as a routing machine comprises a base member 10 from which rises a support 11 that carries at its upper end a work table 12. The table 12 is pivotally mounted to swing about a horizontal axis 13, and overlies a power driven tool operating mechanism 14. The mechanism 14 comprises a reciprocable plunger 15 which is provided at its upper end with a chuck 16 suitable for the holding of a file, saw blade or other tool that operates through an opening 17 in the work table. The plunger 15 is reciprocated through the medium of a crank mechanism 18 which in turn is propelled by an electric motor 19 also mounted upon the base 10 below the normally horizontal plane of the table 12.

An important feature of the invention resides in the construction of the housing 14a of the mechanism mounted below the table. As shown in Figs. 6, 7 and 9 the housing 14a is a one piece unit, except for an inspection plate 14b and a bottom insert 14c, in which is provided bushed bearings for the upper and lower ends of the plunger 15 and for the crank mechanism 18. Upon the upper surface of the housing and surrounding the plunger 15 there is provided an oil collecting cup 14d integrally formed with the housing 14a which has two oppositely disposed ducts communicating with the interior of the housing. When the unit is completely assembled, the housing is a reservoir for the lubricant which keeps the moving parts, including the crank shaft, well oiled through the medium of a combined splash and squirt system, and any oil that is wiped off the plunger 15 upon its down stroke collects in the oil cup 14d and is drained back into the reservoir. The under side of the oil cup is under cut for the purpose of securing thereto one end of an accordian type dust boot 14e, the other end of which is attached to the end of the plunger 15.

The housing 14a is also provided with an upstanding portion 14f, amply ribbed and reinforced, having a stepped upper bearing surface 14g arcuately formed and upon which the tilting table seats. The axis of the arcuate seating surface is substantially coincident with the plane of the working surface to facilitate making accurate adjustments. Above the stepped surface 14g, table clamping means in the form of a threaded hand screw 12a is provided which operates through an arcuate slot in the table supporting bracket 12b. The table 12 has a three-point bearing upon the bracket 12b and clamped at those points by two screws 12e and screw 12f which passes through an adjustable sleeve 12g. By adjusting the sleeve 12g in or out the table 12 may be perfectly aligned, or when necessary, tilted slightly in a plane transverse to its normal direction of tilt and locked by the screw 12f.

The pulley side of the housing 14a has an integrally formed extension 14h, ribbed and reinforced to withstand the lateral pull of the drive belt and the variable forces of the crank mechanism 18 inside of the casing.

Thus, it will be seen that by constructing the part 14a in one piece, a great many tooling operations have been eliminated, and there are no attached parts that can possibly get out of adjustment. The lower plate 14c, provides the lower bearing for the plunger 15 as well as seals the casing against leakage, is assembled and reamed in place to obtain the correct alignment, and since the casing proper projects over and beyond that part, the holding screws are out of sight when the unit is mounted in place upon the base and thus preventing any opportunity for misadjustment.

The rear portion of the base 10 is elevated as at 20 and the upper surface 21 of the elevated portion machined flat in a plane parallel with but below the work surface 22 of the table 12. An over-arm 23, is provided with complemental bearing surfaces 24 adapted to seat upon the surface 21 of the base, and a relatively long forwardly extending portion 25 which overlies the work surface 22 of the table 12.

Normally, the radial position of the axis of the radially extending portion 25 of the arm will intersect the axis of the reciprocable plunger 15, as that is the position best suited for a large number of operations that may be performed upon this machine.

The free end of the over-arm is adapted to carry any one of a number of removable tool heads, the head H illustrated in Figures 1 and 2 of the drawings being a routing head, and the head S illustrated in Figure 6 of the drawings being a jig saw head. The interchangeability of tool heads is rendered possible by constructing each head as a unitary assembly, and providing each assembly with a standardized socket portion 26 which is adapted to fit over a complementally formed end portion 27 of the over-arm. The perpendicularly arranged bearing portions 26 and 27 are preferably circular so that the router head, for example, may be adjusted angularly thereon. When the desired adjustment has been made the attached head is clamped firmly in position by means of a clamp bolt 28. The nut 29 of the bolt seats against a shoulder 30 at the rear of the over-arm, while the shank thereof passes through the hollow portion 25 and has a threaded engagement with the selected head at a point concentric with the bearing surfaces 26 and 27. The clamping action of the bolt, by this arrangement, is exerted in a direction coaxial with the axis of rotation of the head unit and thus uniformly distributes the pressure over the entire clamping surfaces without causing any canting or misalignment of the tool head.

A graduated dial 31, rotatable with the router head, cooperates with a fixed pointer 32 to indicate the angle of adjustment.

The router tool head H comprises a translatable sleeve member 33 mounted for reciprocation in a supporting bracket member 34. Each end of the sleeve member houses anti-friction bearings 35 and 36 which journal a rotatable spindle shaft 37. The outer surface of the sleeve is provided with rack teeth 39 which mesh with a pinion 40 on the pinion shaft 41. The pinion shaft is journaled in the bracket 34 and is provided at one end with a flanged hand wheel 42 and at its opposite end with a counterbalance mechanism 43. The counterbalance mechanism includes a spiral spring 43a, one end of which is detachably secured to the pinion shaft and the other end to the inside of the housing 43b, which in turn is locked to the bracket 34 by rib and groove means 43c. The entire assembly is secured in place by means of a screw 43d threaded into the end of the pinion shaft 41. A spindle sleeve clamping means, operable by the hand lever 44 is also provided by the bracket 34 for clamping the spindle sleeve and thereby the tool spindle in a predetermined position as shown by the adjustable graduated depth gauge and stop mechanism 45.

It will be noted that the spindle sleeve illustrated herein is relatively long and small in diameter whereby it is possible to have the axis thereof relatively close to the bearing surfaces provided by the normally rigid over-arm and thus materially reducing the spindle overhang and permitting its axis to lie coincident with the axis of the jig saw head S. A further advantage to be observed in the mounting of the translatable sleeve in the bracket 34 is that the spindle is firmly supported at the lowest possible position adjacent the tool, the relatively long bearing surfaces provided by the bracket for the spindle sleeve eliminates side play, and all of the parts adjacent the tool end of the assembly may be kept relatively small and thereby afford the user an unobstructed view of the tool itself.

The power for driving the spindle shaft is derived from a high speed motor 46 mounted at the upper end of the spindle sleeve 33 well out of the way, and is connected to the spindle shaft 37 by a resilient shock absorbing coupling 47. The motor proper is maintained in fixed relation with the spindle sleeve by means of a rigid reducing coupling 48. The smaller end 49 of the rigid coupling is secured to the end of the spindle sleeve and the other end 50 is enlarged substantially to the diameter of the motor and encloses a major portion of the same. In this way the alignment of the running parts is maintained at all times, and since the whole assembly is guided and supported by the sleeve in the long bearings of the bracket 34, no errors are introduced or no misalignment occurs in readjusting the assembly for depth of cut or in changing one head for another.

An outlet 51, conveniently located in the radial arm 25, is provided for supplying current to the router motor 46, starting and stopping of which is controlled from a built-in switch 52, also conveniently located.

In performing certain routing operations, dove-tailing for example, it is necessary that one of the two members used in the making of the joint extend downwardly at the side of the table. It is also necessary that the router head be swung laterally so that its tool may operate upon the upstanding workpiece. To accomplish that end the massive over-arm 23 and all the parts carried thereby is arranged to swing radially about a vertical axis at the rear of the machine. The table 12 is made large enough so that its marginal edges 12c and 12d extend beyond the edges of the base 10 and any parts mounted thereon, so that a long workpiece may stand on end without interference. Figures 1 and 4 illustrate more clearly a preferred method of obtaining lateral movements of the arm and for clamping the arm in adjusted position. As hereinbefore explained the surfaces 21 and 24 between the arm and the base are relatively large and lie in a plane parallel to the normal plane of the work surface.

The forward portion of the arm footing is recessed at 53 and apertured at 54 to accommodate a headed screw 55 which acts as the pivot point. Directly to the rear of the pivot and in a line intersecting the axis of the pivot and router spindle, a clamp bolt 56 is threaded. The bolt 56 operates through an arcuate slot 57 and engages the underside of a transverse web in the base 10. Consequently when the arm is clamped, the clamping forces of the screws 55 and 56 act in the plane that includes the axis of the arm and head attachments and effect powerful clamping action.

With the jig saw head mounted upon the over-arm, the forces acting upon the outer end tend to bend the arm downwardly at the elbow. The present arm, however, is made substantially tubular and adequately ribbed and reenforced, see Figure 2, and effectively resist the collapsing stresses. The long bearing surfaces 21 and 24 and widely spaced clamp bolts 55 and 56 effectively prevent any yielding at that point. The bed or base 10 is also reenforced against bending, by means of a long curved portion 10a which extends from the surface 24 to a point well toward the front of the base.

When using the machine as a router, head H attached, the forces incident to the tooling operation ordinarily are not so great as in jig sawing and usually act in the opposite direction.

As illustrated in Figure 4 the arcuate slot 57 at the wider end of the base permits a limited swinging movement of the arm to either side of the center, and the ends of the slot act as stops and prevent the user from swinging of the arm too far. Provision is also made for obtaining a greater movement of the arm at one side of the working surface than at the other which comprises a threaded hole 58 formed in arm member 23 at a point removed from the center line, into which the clamp bolt 56 may be inserted and operated as before. By moving the clamp bolt to the hole 58 the arm may be swung angularly a further distance, equal to the angular displacement of the hole 58 to one side of the center, and firmly clamped. Figure 4 of the drawings illustrates the expanded triangular form of the arm bearing surfaces and in dotted lines various radial positions the arm may assume, and in all positions the arm is supported upon long and wide surfaces. And since no parts project above the plane of the table, the user has ample available working space under the arm, in the present case approximately 24″. To restore the arm to its exact center position a locating pin 81 is provided which fits an aperture formed half in the base and half in the over-arm. When the two halves are in alignment, the pin may be inserted and the arm clamped in its centered position.

To operate the machine, the operator clamps the arm in the desired angular position, mounts the work upon the table, and by operating the hand wheel 42, feeds the cutter spindle assembly toward the work the required distance. Figure 5 of the drawings illustrates an alternative method of feeding the spindle which comprises a foot treadle 59, pulleys 60, 61 and 62, and a flexible cable 63. One end of the cable is wound around the flanged portion of the hand wheel 42 and the other end fastened to the treadle. The spring counterbalance means 43 serve to keep the connections taut in all angular positions of the arm. It will be noted that guide pulleys 61 and 62 are mounted substantially coincident with the vertical axis of the swinging arm which permits use of the foot treadle in all angular positions, and at the same time keeps the working space under the arm clear of all obstructions.

Certain routing operations require the use of a saw. For example, in the preparation of printing plates, an operator routs out sections or areas of the metal surface and then must trim the routed plate to a particular size. And so that it will be unnecessary for the user to take partly finished workpieces to a different machine for sawing, the routing machine of the present invention is arranged for sawing operations as well. For that purpose, the router assembly H is provided with a depending flanged member 64, to which may be secured a combined pressor foot and back stop mechanism 65, the function of which is to hold the workpiece firmly to the table and to provide a rear support for the saw blade. The mechanism includes telescoping members 66, a spring foot 67 and a blade supporting roller 68. Thus, with a router head mounted upon the arm, a saber blade saw may be inserted in the chuck 16 and reciprocated through the opening 17 in the table and the machine tool used in the normal way for sawing. Figure 1 of the drawings illustrates the hold-down mechanism swung out of the way. A guide fence 69 is provided for the guiding of pieces past the saw or under the routing tool.

When the sawing operation is completed, the saw is removed, the hold-down and saw guide mechanism swung out of the line of the routing spindle, and the machine is again ready for subsequent routing operations.

In cases where it is necessary to use the machine for fine fret work, etc., the router head H is quickly removed by loosening the head clamp bolt 28 and a jig saw head S applied in its place. The jig saw head illustrated in the fragmentary Figures 6 and 7, comprises a bracket 34a provided with bearing surfaces 26a also adapted to fit the bearing surfaces at the free end of the over-arm, and is clamped thereto by the head clamp screw 28. The removable bracket 34a, carries a hollow reciprocable plunger 70, which projects from the lower end, and carries at its outer end a removable saw gripping chuck 71. A plunger retracting spring 72, seated at one end against an inner wall of the bracket 34a and at its opposite end against an adjustable plate 72a mounted upon the plunger 70, normally urges the plunger to its upper position whereby the saw blade 73 is kept tight. A pin 74 insertable in apertures 70a in the plunger, is provided for locking the plate 72a in a predetermined position relative to the plunger 70. The apertures 70a in the plunger are spaced from each other the distance between different lengths of standard blades, that is, approximately ½″. For example, if a user desires to use a 4 inch blade, the pin is inserted in an aperture near the top of the plunger the result of which is to lower the chuck end the required distance without unduly loading the spring 72. If a 5 inch blade is to be used, the pin is inserted in a lower hole in the plunger which raises the chuck end the amount necessary to accommodate the 5 inch blade while nevertheless maintaining a given tension upon the spring. By this means, it will be seen blades of various lengths may be used in the machine, and each given its proper tension. On the other hand, if the user has unusually long blades, each end thereof may be inserted through the chucks 16 and 71 and gripped thereby at some intermediate point. The two chucks being hollow, and likewise the plungers 15 and 70, the portions of the blade beyond the chucks may extend within the hollow plungers. In this way extra long blades may be used and adjusted up or down as required. Plunger 15 is provided near its lower end with a transverse plug which keeps the lubricant from pumping up through the chuck 16.

The head end of the pin 74 projects beyond the periphery of the plate 72a into a longitudinal channel 75 formed in the inner wall of the housing portion 34b and serves as a guide means to keep the plunger, and in turn the saw blade, from turning. To turn the saw 90° or to some intermediate angle, each chuck is threaded to its respective plunger and equipped with a jam nut 16a and 71a whereby it may be rotated and locked in a predetermined angular position. Frequently used angles such as 90° and 180° are quickly determined by loosening the screws 34c and turning the casing 34b until other diametrically spaced holes 34d therein line up with the screws 34c.

Under the plate 72a, a washer 76 preferably of leather, is provided for the purpose of guiding the upper end of the plunger and for the further purpose of acting as a piston in the cylinder 77. On each down-stroke of the saw, the air within the cylinder is compressed and discharged through a small opening 78 in the bottom of the casing. The hole 78 is located at the front of the saw and directs a blast of air upon the workpiece directly in front of the saw, thus, removing chips and saw-dust from the work and keeping that space clear so the operator can properly guide the workpiece. Preferably the end of the spindle 70 is capped or plugged as at 70b, to minimize the tendency to blast air through the center of the spindle.

As with the router head H, the jig-saw head S is also equipped with work hold-down and saw supporting means 79. In this instance the hold-down foot 67 and roller 68 are supported from an extensible rod 80 which is adapted to be clamped to the head 34a in its proper elevated position, by a hand clamp means 79a.

Without further analysis, the foregoing will so fully reveal the gist of this invention that others can, by applying current knowledge, readily adapt it for various utilizations by retaining one or more of the features that, from the standpoint of the prior art, fairly constitute essential characteristics of either the generic or specific aspects of this invention and, therefore, such adaptations should be, and are intended to be, comprehended within the meaning and range of equivalency of the following claims:—

Having thus revealed this invention, I claim as new and desire to secure the following combinations and elements, or equivalents thereof, by Letters Patent of the United States:

1. A routing machine combining a base member; an elevated work surface at one end thereof; a pedestal at the other end of said base, having an upper supporting surface parallel to said work surface but in a plane below said work surface; an L-shaped arm member pivotally mounted for lateral movement upon the supporting surface of said pedestal and having a portion thereof extending forward in overlying relation with said work surface; annular bearing surfaces at the end of said portion; a tool head removably mounted to the bearing surfaces of said arm member; a tool operating element translatably mounted in said head and normally movable in a direction transverse to the axis of said annular bearing surfaces; means for clamping said tool head to said arm portion in a position in which the axis of said translatable element is in the plane of said L-shaped arm; and means for clamping said arm to said pedestal in a predetermined angular position thereby to maintain said translatable element in a predetermined position relative to said elevated work surface.

2. A routing machine combining a base member; an arm member pivoted to said base and movable laterally relative thereto; a translatable sleeve member; a spindle shaft journaled in said sleeve member; a high speed motor mounted upon said sleeve member at one end thereof; a motor shaft; a resilient shock absorbing connection between said motor shaft and said spindle shaft; a bracket member mounted upon said arm member for supporting said sleeve intermediate its ends and the parts carried thereby normally in fixed relation to said base member; means for translating said sleeve member in said supporting bracket; and means for clamping said arm member in a predetermined laterally adjusted position thereby to maintain said translatable sleeve member and parts carried thereby in a predetermined position relative to said support member.

3. A machine tool combining a base member; a work supporting surface at one end thereof; a hollow arm member rising from the other end of said base and having its free end overlying said work surface, said hollow arm member having bearing surfaces provided at its free end adapted to receive a tool head attachment for performing operations upon the workpiece; and means for clamping same selectively to the bearing surfaces at the free end of said arm, comprising screw means extending through said hollow arm member from the region adjacent said bearing surfaces and operative from the rear of the machine for clamping a said tool head attachment to said arm in cooperative relation with said work supporting surface.

4. The combination set forth in the preceding claim in which the said bearing surfaces at the free end of the arm comprise a cylindrical surface formed concentric with the axis of the table overlying portion of the arm and an annular surface arranged perpendicularly to said cylindrical surface adapted to engage complemental surfaces formed upon the attachment and whereby said cylindrical surface serves as an axis about which the head attachment may revolve and said perpendicular surface an abutment against which the head attachment may be clamped by said screw means in a predetermined angularly adjusted position.

5. A routing machine combining a base member provided with a normally horizontal work supporting surface; an arm member pivoted to said support and provided with a radially projecting portion extending forward and overlying said work surface; a tool head assembly mounted upon the end of the forwardly extending portion of said arm, comprising a spindle shaft, a bracket member for translatably supporting said shaft intermediate its ends; a high speed motor located at one end of the said shaft and outside of the shaft's supporting means for driving same, the axis of said shaft and motor being coaxially arranged and normally in a plane perpendicular to said work surface; and means for swinging said arm member on said base portion thereof laterally in a plane parallel to said work surface to position the axis of said translatable spindle shaft in a predetermined position relative to said work supporting surface; and means for clamping said arm in adjusted position.

6. A routing machine combining a base member; a horizontally extending arm member; means pivotally mounting one end of said arm member upon a vertical axis to said base member; a routing head assembly detachably mounted upon the free end of said arm, said assembly comprising a bracket member, a spindle sleeve translatably mounted in said bracket, a high speed motor mounted upon one end of said sleeve outside of the sleeve's mounting in the bracket, a tool spindle journaled in said sleeve and adapted to be provided with a cutting tool at its outer end; said bracket member affording bearing and guiding surfaces for the said sleeve intermediate said motor and the outer end of the tool spindle; means for removably mounting said bracket member of said assembly to the free end of said pivoted arm member; and means for clamping said arm member in a predetermined angular position.

7. A routing machine combining a base member; a router unit secured thereto comprising a high speed motor, a motor casing having a reduced and relatively long non-rotatable sleeve-like portion extending therefrom in coaxial alignment with the motor shaft of said motor; a relatively long spindle shaft journaled in said sleeve-like portion; a supporting bracket member for said sleeve-like portion; means swivably mounting said bracket member to said base member on an axis substantially perpendicular to the axis of said spindle shaft; and means for clamping said unit in a predetermined angularly adjusted position to said base member.

8. The combination set forth in the preceding claim characterized by the provision of means provided in part by said swivably mounted supporting bracket member and in part by said sleeve-like portion for non-rotatably translating said sleeve portion and motor and spindle carried thereby in said bracket member in the direction of the axis of said spindle.

9. A routing machine combining a support; a high speed electric motor including a motor frame and a motor shaft extending from one end thereof; a relatively long spindle shaft connected to said motor shaft and coaxially arranged therewith; a translatable sleeve member for supporting said spindle shaft, said sleeve member being provided with bearing means at each end for journaling said spindle shaft concentrically therewith; a bracket member secured to said sleeve for mounting said motor in fixed relation therewith thereby to maintain said relatively long spindle shaft and said motor shaft in coaxial alignment; and means secured to said sleeve member for mounting said sleeve and motor and spindle supported thereby in fixed relation to said support.

10. A routing machine combining an elongated hollow arm member; a bracket member pivotally mounted at one end of said arm; a sleeve member translatably journaled intermediate its ends in said bracket; a motor mounted in fixed relation to one end of said sleeve; a tool spindle journaled in said sleeve and arranged to be propelled by said motor; means for translating said sleeve and the parts carried thereby in said pivoted bracket member; and means operable from the other end of said arm member for clamping said bracket member thereto in a predetermined angular position, comprising a draw bolt element passing longitudinally through said hollow arm and operatively engaging said bracket member at one end and said arm member at the other end.

11. A routing machine combining a normally stationary support; a sleeve member translatably mounted intermediate its ends in said support; a router spindle shaft journaled in said sleeve; a motor supporting bracket mounted in fixed relation to said sleeve at one end thereof; said bracket having an enlarged portion adapted firmly to seat a motor, and a reduced portion adapted to fit one end of said sleeve; a high speed motor seated in the enlarged portion of said bracket; a driving connection between said motor and said router spindle; and manually operated means for translating said sleeve and parts carried thereby in said support.

12. A routing machine combining a support member; a spindle sleeve translatably mounted in said support and extending from one end thereof; a router spindle rotatably mounted in said sleeve and translatable bodily therewith; a high speed motor mounted upon the end of said sleeve extending beyond the said support; means establishing a driving connection between said router spindle and said motor; and means for translating said sleeve and parts carried thereby relative to said support.

13. A routing machine combining a base member; a work support at one end thereof; an arm member pivotally mounted at the other end of said base and adapted to swing laterally about a vertical axis, said arm member having a forwardly projecting portion overlying said work support and provided at its free end with annular bearing surfaces adapted to seat a routing assembly; a routing assembly detachably mounted on said bearing surfaces consisting of a bracket member having annular bearing surfaces complemental to the bearing surfaces formed upon said arm member, a relatively long spindle sleeve translatably mounted in said bracket and normally arranged substantially perpendicularly to the plane of said work support; a relatively long spindle shaft rotatably journaled in said sleeve and translatable therewith, and a high speed motor mounted at one end of said translatable sleeve with the axis of the motor shaft coaxial with and secured to said spindle shaft, said motor being movable bodily with said sleeve in an axial direction; means for adjusting said bracket upon said annular bearing surfaces about the axis of the forwardly projecting portion of said arm, thereby to adjust the angular relation of said spindle to said work support and means for clamping said assembly to said arm in a predetermined angularly adjusted position and said arm member to said base in a predetermined laterally adjusted position.

14. The combination set forth in claim 13 including manual means for translating said sleeve member and parts carried thereby, including a hand wheel having a flanged portion journaled in said tiltable bracket and operatively connected to said sleeve member, a foot treadle, and a flexible connection between said foot treadle and the flanged portion of said wheel operative in angularly adjusted positions of the said bracket on said arm for operating said wheel.

15. A routing machine combining a support; a tilting work table mounted thereon; an arm member overlying said table; a spindle mounted on said arm on an axis normally perpendicular to the plane of said table; means for tilting and leveling said table about transverse axes lying substantially in the plane of the table to bring about said perpendicular relation, comprising a bracket member pivotally mounted to said support; said work table having a three-point bearing contact on said bracket, and having its work surface substantially coincident with the axis of rotation of said pivotally mounted bracket; said three-points of contact also lying substantially in the plane of the table; a sleeve member adjustable relative to said bracket member and operatively engaging said table at one of said points of contact and screw means operating in said sleeve member for clamping said sleeve to said table and thereby said table to said bracket in a predetermined adjusted position.

WILLIAM FERDINAND OCENASEK.